(12) United States Patent
Kuskin et al.

(10) Patent No.: US 6,999,443 B1
(45) Date of Patent: Feb. 14, 2006

(54) HARDWARE MAC

(75) Inventors: Jeffrey Scott Kuskin, Mountain View, CA (US); Tao-Fei Samuel Ng, Fremont, CA (US); Andrew M. Davidson, San Jose, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 964 days.

(21) Appl. No.: 09/663,045

(22) Filed: Sep. 15, 2000

(51) Int. Cl.
  *H04Q 7/24* (2006.01)
(52) U.S. Cl. .................................... 370/338; 370/463
(58) Field of Classification Search .............. 370/328, 370/336, 337, 338, 345, 347, 442, 445, 447, 370/463, 465, 471, 473, 474, 278, 282, 310, 370/312; 375/259, 260, 231, 256, 354; 713/150, 713/151; 714/752, 758
  See application file for complete search history.

(56) References Cited

U.S. PATENT DOCUMENTS

| | | | | |
|---|---|---|---|---|
| 5,636,140 A | * | 6/1997 | Lee et al. | 370/469 |
| 5,717,688 A | * | 2/1998 | Belanger et al. | 370/331 |
| 5,909,564 A | | 6/1999 | Alexander et al. | 395/311 |
| 5,982,807 A | * | 11/1999 | Snell | 375/146 |
| 6,341,145 B1 | * | 1/2002 | Hioe et al. | 375/256 |

FOREIGN PATENT DOCUMENTS

| | | |
|---|---|---|
| EP | 0 640 927 A1 | 8/1994 |
| EP | 1 133 129 A2 | 9/2001 |

OTHER PUBLICATIONS

IEEE Std 802.11a, Wireless LAN Medium Access Control (MAC) and Physical Layer (PHY) specification: High-Speed Physical Layer in the 5 GHZ Band, pp. 1-82, 1999.*
Hahn et al, PRISM Wireless LAN Chipset-Testbed Design, Worcester Polytechnic Institute, pp. 1-8, 1997.*
Kamerman et al, WaveLan-II-A High Performance Wireless LAN for Unlicensed Band, Bell Labs Technical Journal, pp. 118-133, 1997.*

* cited by examiner

*Primary Examiner*—Frank Duong
(74) *Attorney, Agent, or Firm*—Pillsbury Winthrop Et Al

(57) ABSTRACT

A Hardware MAC (Media Access Control) unit implements time-critical functions according the 802.11 standard for telecommunications, thereby enhancing system performance. The MAC layer includes three sub-layers: MLME (MAC Sublayer Management Entity), which connects the MAC unit with the host CPU, FTM (Frame Transition Manager), which connects the MAC unit with the network, and FLPM (Frame Level Protocol Manager), which internally connects the MLME sub-layer with the FTM sub-layer. In particular, the FLPM manager includes time-critical and non-time-critical functions that are customarily implemented in software on the MAC by a MAC CPU (Central Processing Unit). The hardware MAC implements time-critical FLPM functions in hardware on the MAC and implements non-time-critical FLPM functions in software on the host CPU so that requirements for processing software on the MAC preferably may be altogether eliminated or alternatively may be substantially reduced.

37 Claims, 6 Drawing Sheets

HARDWARE MAC

BACKGROUND OF THE INVENTION

1. Field of Invention

The present invention relates to Media Access Control (MAC) for a telecommunications system and more particularly to a MAC unit that implements time-critical functions in hardware.

2. Description of Related Art

In FIG. 1 a telecommunications network 2 includes a network unit 4 that communicates with other elements of the network 8. The network unit 4 includes a Host CPU (Central Processing Unit 6) and an NIC (Network Interface Card 10), where these components are linked by a Peripheral Component Interconnect (PCI) bus 9. The NIC 10 includes a MAC unit 12 with a CPU 14 and an antenna 15 for radio communication with other elements of the network 8.

The MAC requirements for the 802.11 standard for telecommunications are discussed in detail in "ISO/IEC 8802-11, Part 11: Wireless LAN Medium Access Control (MAC) and Physical Layer (PHY) specifications." The hardware MAC unit 12 has an associated MAC layer of processes that are implemented either in hardware (HW) or in software (SW). In FIG. 2 the role of the MAC layer 16 in the process flow of the network is illustrated for a conventional implementation, the MAC layer 16 providing a process connection between the Host CPU 6 and the network 8 where the fundamental unit of transmission is a frame. The MAC layer 16 includes three sub-layers: MLME (MAC Sublayer Management Entity 18), which connects the MAC unit 12 with the host CPU 6, FTM (Frame Transition Manager 22), which connects the MAC unit 12 with the network 8, and FLPM (Frame Level Protocol Manager 20), which internally connects the MLME sub-layer 18 with the FTM sub-layer 22.

The MLME processes 18 include high-level management functions, including identification of who is on the network and the granting of associated permissions. Typically, these processes are not considered to be time-critical and are implemented in software on the host CPU 6.

The FTM processes 22 include the low-level functions for the connection to the network via the PHY (Physical Layer 24), which provides the most basic operations for transmission of frames between the network unit 4 and the rest of the network 8. These fundamental processes F— are generally considered to be time critical so that the FTM processes 22 are implemented in hardware on the MAC unit 12 and the PHY processes 24 are implemented in hardware elsewhere on the NIC 10.

The FLPM process 20 include both time-critical and non-time-critical functions that relate to the processing of frames between the high-level functions associated with the MLME process 18 and the low-level functions associated with the FTM process 22. The time critical functions may need to be carried out on the scale of approximately 30–40 microseconds as compared with the smallest time scales in the system, which are of the order of 16 microseconds, for the separation between frames. These may include operations related to interframe spacing and timing, retrying frames, encrypting frames, decrypting frames, filtering frames, receiving acknowledgements, and transmitting beacons. By contrast, the non-time-critical functions may only need to be carried out on the scale of milliseconds or even seconds. These may include operations related to association responses and requests, authentications, collecting and managing network statistics, and system reconfigurations due to roaming.

Because of the inter-relatedness of the functions associated with the FLPM sub-layer 20, both the time-critical functions and the non-time-critical functions are typically implemented in software on the MAC CPU 14, not the host CPU 6, Implementing the FLPM sub-layer 20 on the host CPU 6 would lead to additional time delays associated with transmission across the PCI bus 9 from the host CPU 6 to the MAC unit 12, delays that may compromise the time-critical functions of the FLPM sub-layer 20. However, there are also disadvantages associated with the implementation of the FLPM sub-layer 20 on the MAC CPU 14. For example, the MAC CPU 14 takes up limited space in the MAC unit 12 and consumes valuable power. Additionally, unforeseen interactions between software components may lead to additional operational errors.

SUMMARY OF THE INVENTION

Accordingly, it is an object of this invention to provide a MAC unit with hardware components for selected time-critical functions.

It is a further object of this invention to provide a MAC unit with hardware components for selected time-critical functions on a single IC (Integrated Circuit) chip, which chip may include other functions.

It is a further object to provide a MAC unit that eliminates or substantially reduces the need for a MAC CPU.

It is a further object to provide a MAC unit that reduces onboard power and space requirements for implementing MAC functions.

It is a further object to provide a MAC unit with greater stability and reduced operational errors.

The above and related objects of the present invention are realized by a method for processing frames in a MAC layer with hardware operations, comprising: receiving an incoming frame from the network; processing the incoming frame for FLPM (Frame Level Protocol Manager) time-critical functions; from the act of processing the incoming frame for FLPM time-critical functions, sending an outgoing frame to the host; from the act of processing the incoming frame for FLPM time-critical functions, formulating FLPM time-critical responses; from the act of processing the incoming frame for FLPM time-critical functions, accumulating statistics; from the act of processing the incoming frame for FLPM time-critical functions, updating a MAC state; from the act of formulating FLPM time-critical responses; formulating an outgoing frame; from the act of formulating an outgoing frame, transmitting the outgoing frame to the network; enerating a special frame for the act of formulating an outgoing frame; and receiving an incoming frame from the host CPU for the act of formulating an outgoing frame.

The present invention advantageously combines a hardware implementation of time-critical FLPM functions on the MAC with a software implementation of non-time-critical FLPM functions on the host. According to the present invention, requirements for processing software on the MAC preferably may be altogether eliminated or alternatively may be substantially reduced.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, where.

DETAILED DESCRIPTION OF THE PRESENTLY PREFERRED EXEMPLARY EMBODIMENTS

Figure 1:
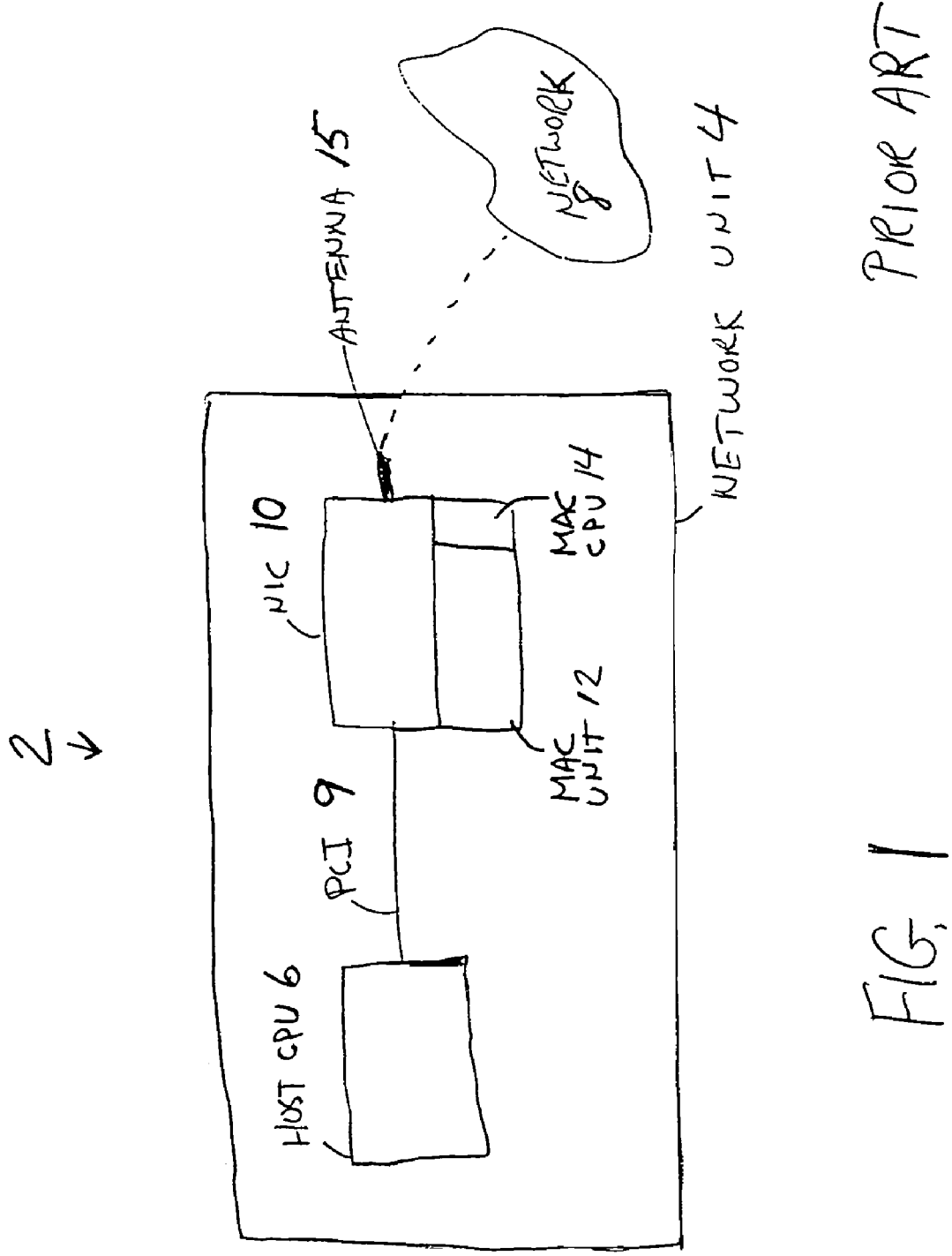
FIG. 1 is a diagram illustrating a network unit in a conventional telecommunications network.
Figure 2:
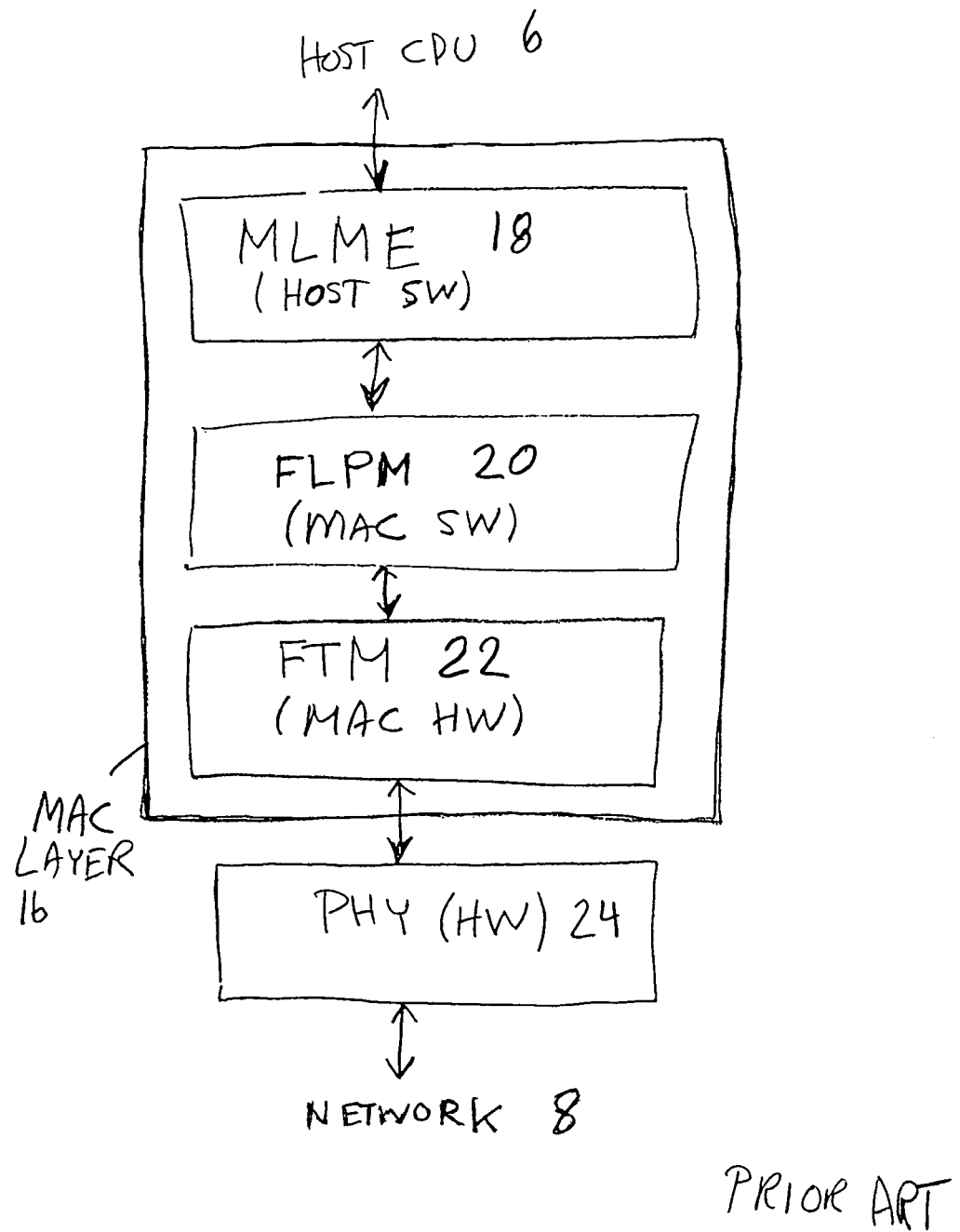
FIG. 2 is a diagram illustrating processes associated with a MAC unit in a conventional telecommunications network.
Figure 3:
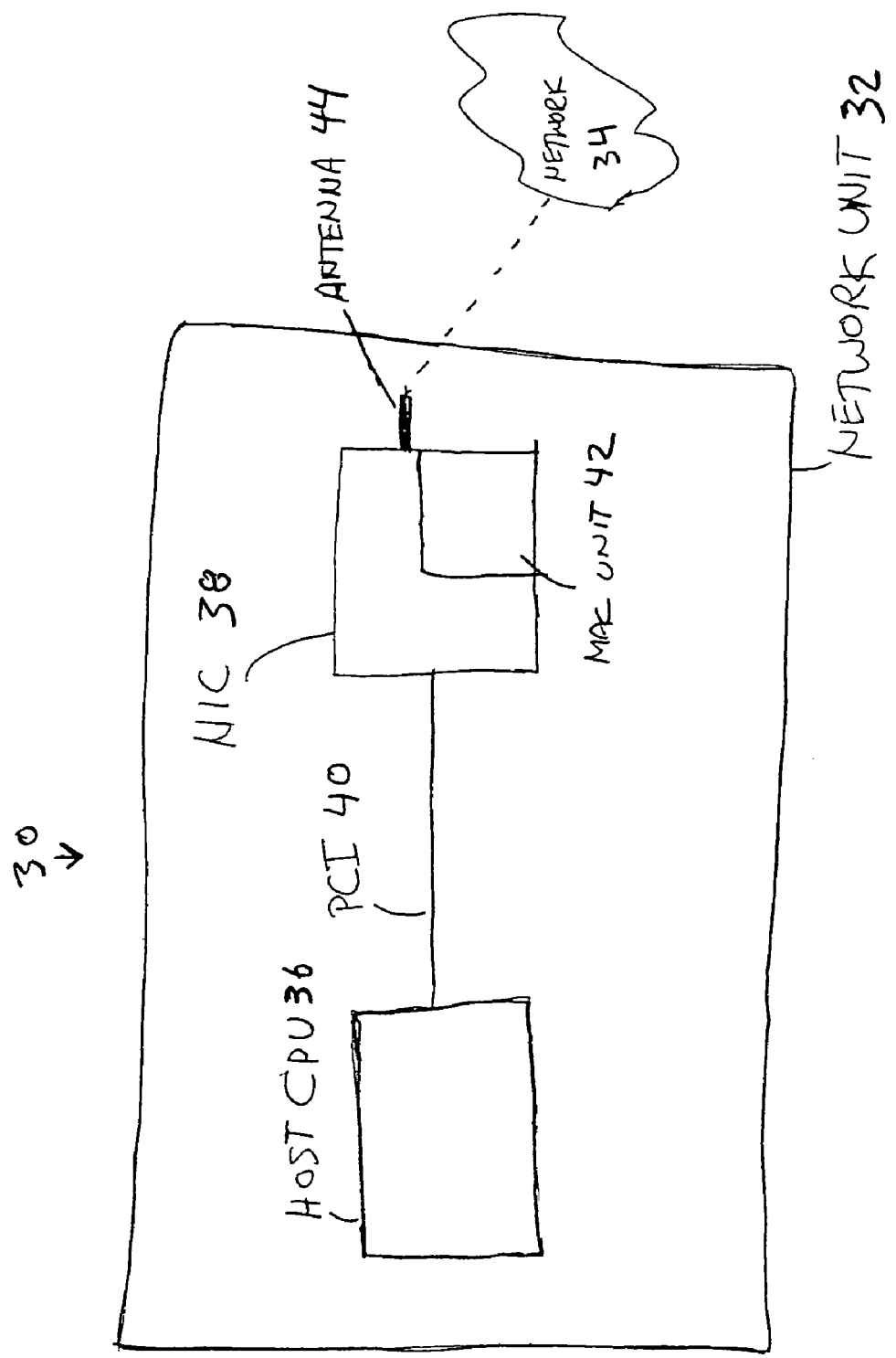
FIG. 3 is a diagram illustrating a preferred embodiment of a network unit in a telecommunications network according to the present invention.

A preferred embodiment of a telecommunications network 30 according to the present inventions is illustrated in FIG. 3. The network 30 includes a network unit 32 that communicates with other elements of the network 34. The network unit includes a Host CPU (Central Processing Unit) 36 and an NIC (Network Interface Card 38), where these components are linked by a Peripheral Component Interconnect (PCI) bus 40. The NIC 38 includes a MAC unit 42 with an antenna 44 for radio communication with other elements of the network 34. As compared with the MAC unit 12 of the conventional NIC 10, the MAC unit 42 of the preferred embodiment does not include a CPU.

Figure 4:
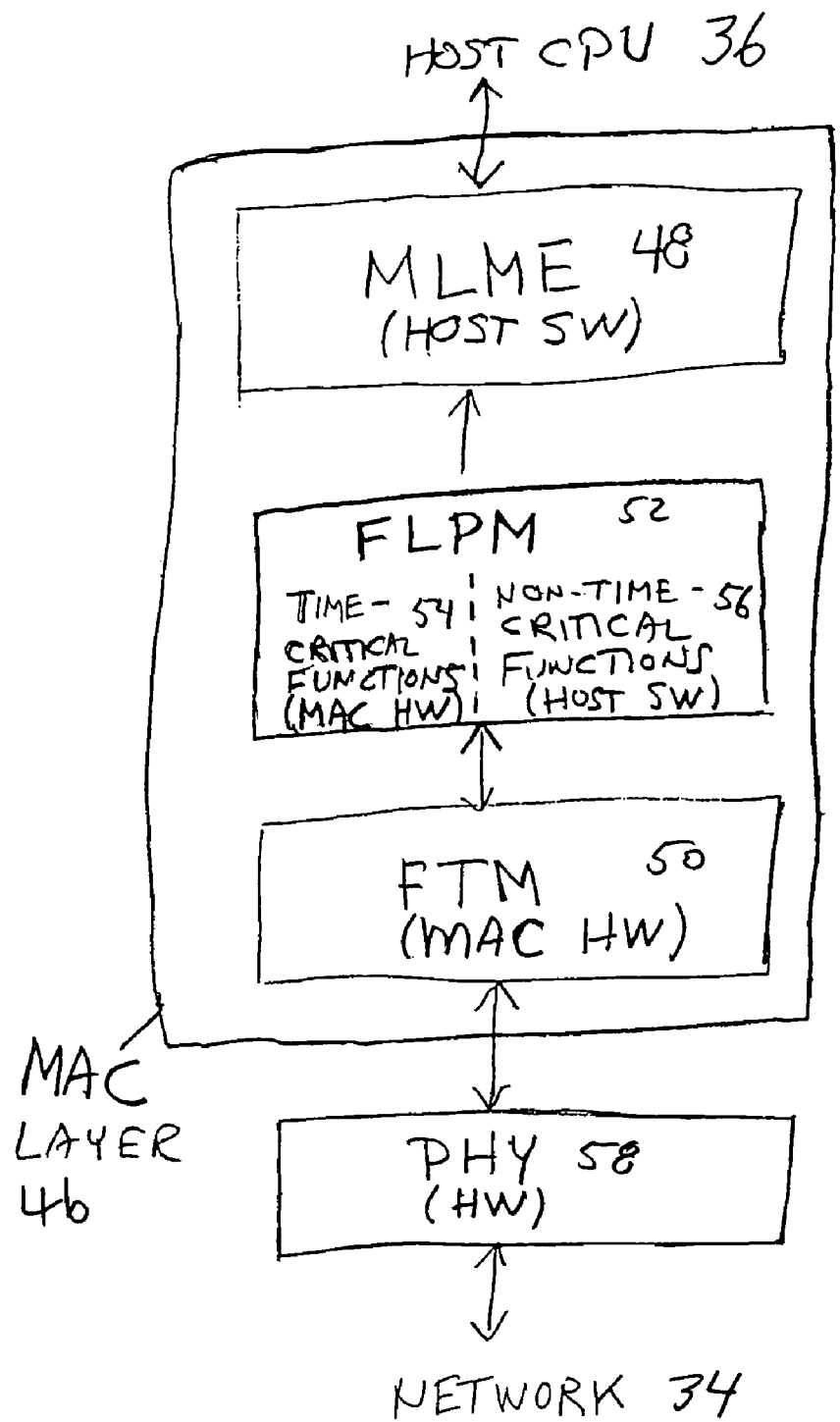
FIG. 4 is a diagram illustrating processes associated with a preferred embodiment of a MAC unit in a telecommunications network according to the present invention.

Analogously to the MAC layer 16 of the conventional implementation, the hardware MAC unit 42 has an associated MAC layer of processes that are implemented either in hardware or in software. In FIG. 4 the role of the MAC layer 46 in the process flow of the network is illustrated. The MAC layer 46 includes three sub-layers: MLME (MAC Sublayer Management Entity 48), which connects the MAC unit 42 with the host CPU 36, FTM (Frame Transition Manager 50), which connects the MAC unit 42 with the network 34, and FLPM (Frame Level Protocol Manager 52), which internally connects the MLME sub-layer 48 with the FTM sub-layer 50.

Qualitative descriptions of functions included in these sub-layers are presented above. The MLME processes 48, which include high-level management functions, are implemented in software on the host CPU 36. The FTM processes 50, which include the low-level functions for the connection to the network 34 via the PHY (Physical Layer 58), are implemented in hardware on the MAC unit 42, and the PHY processes 58 are implemented in hardware elsewhere on the NIC 38.

The FLPM processes 52 includes both time-critical 54 and non-time-critical 56 functions that relate to the processing of frames between the high-level functions associated with the MLME processes 48 and the low-level functions associated with the FTM processes 50. In the FLPM sub-layer 52 of the preferred embodiment, the time-critical functions 54 are implemented in hardware on the MAC 42, and the non-time-critical functions 56 are implemented in software on the host CPU 36. By contrast, in the MAC unit 12 of the conventional network, functions associated with the FLPM processes 20 are implemented in software on the MAC CPU 14. As discussed above, the time-critical functions 54 may need to be carried out on the scale of approximately 30–40 microseconds in a system where the smallest time scales (e.g., for frame separation) occur on the order of 16 microseconds while the non-time-critical functions may only need to be carried out on the scale of milliseconds or even seconds.

Figure 5:
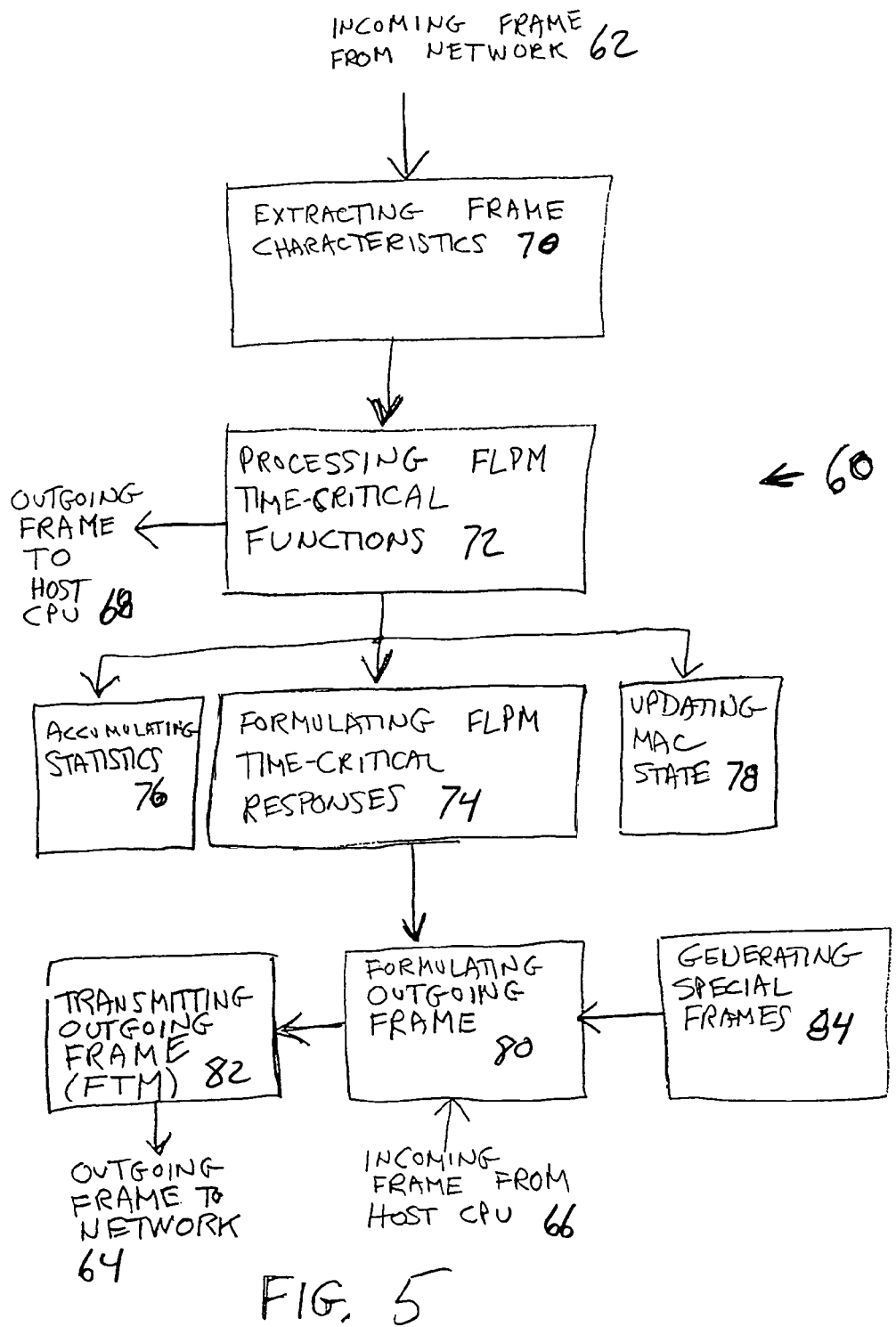
FIG. 5 is a diagram illustrating process flow for hardware components in a preferred embodiment of a MAC unit according to the present invention.

FIG. 5 shows a process flow diagram 60 for hardware components of the MAC unit 42 in the preferred embodiment, where the process flow is represented by process blocks. The process flow includes incoming frames from the network 62 and outgoing frames to the network 64. Similarly the process flow includes incoming frames from the host CPU 66 and outgoing frames to the host CPU 68. Incoming frames from the network 62 go to a block 70 for extracting frame characteristics. Output from this block 70 goes to a block 72 for processing FLPM time-critical functions in correspondence to the FLPM time-critical functions 54 of FIG. 4. Output from this block 72 includes outgoing frames to the host CPU 68, which include the triggering of FLPM non-time-critical functions 56. Output from this block 72 also can be directed to the network 64 by way of a block 74 for formulating time-critical responses again in correspondence to the FLPM time-critical functions 54 of FIG. 4. At the same time the output is processed by blocks for accumulating statistics 76 and for updating MAC states 78.

The output from the block 74 for formulating FLPM time-critical responses goes to a block for formulating an outgoing frame 80. Output from the block 80 for formulating an outgoing frame goes to a block for transmitting an outgoing frame 82, which belongs to the FTM sub-layer 50. The block 80 for formulating an outgoing frame also takes input from the host CPU 66 and from a block 84 for generating special frames. Except for the for the block 82 for transmitting an outgoing frame, which belongs to the FTM sub-layer 50, all blocks 70, 72, 74, 76, 78, 80, 84 in the embodiment shown in FIG. 5 belong to the FLPM sub-layer 52.

Figure 6:
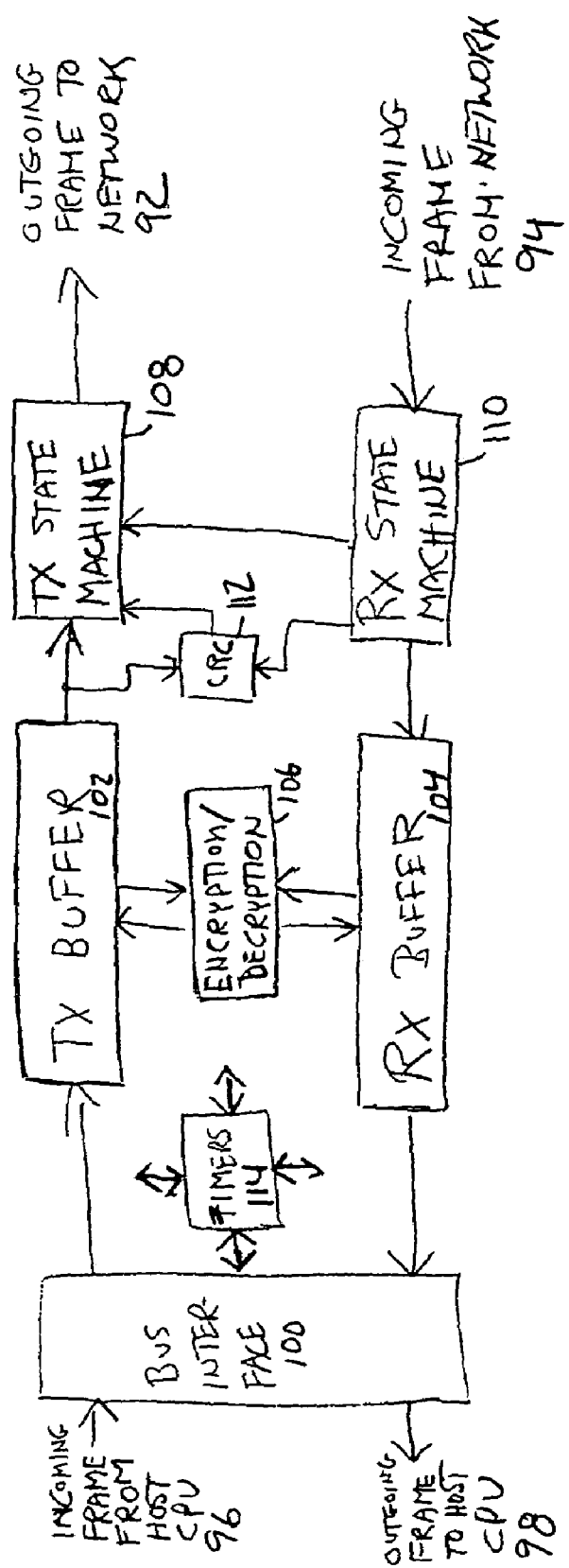
FIG. 6 is a diagram illustrating hardware components in a preferred embodiment of a MAC unit according to the present invention.

Correspondingly, FIG. 6 shows hardware components of the MAC unit 42 in the preferred embodiment, where the hardware flow is represented by hardware blocks. The MAC hardware receives incoming frames from the network 94 and transmits outgoing frames to the network 92 (via the PHY and the antenna). Similarly the MAC hardware receives incoming frames from the host CPU 96 and transmits outgoing frames to the host CPU 98 (via the PCI bus). Traffic from the host connects to the MAC unit via a bus interface 100, which transfers data to and from the MAC unit respectively via a Tx buffer 102 and an Rx buffer 104. A block 106 for encryption and decryption connects these two buffers 102, 104. Output from the Tx buffer 102 passes to a Tx state machine 108 and from there to the network 92, while traffic from the network 94 goes to an Rx state machine 110 and from there to the Rx Buffer 104. Connections between the Rx state machine 110 and the Tx state machine 108 include a CRC (Cyclic Redundancy Code) block 112 for error checking. Additionally a timer block 114 is connected to other blocks in the system for necessary timing operations.

In the preferred embodiment, functions in the process blocks of FIG. 5 are implemented in hardware blocks of FIG. 6.

The process block 70 for extracting frame characteristics includes functions for determining destination address, encryption status, frame type, retry status, and special-frame status; these functions are implemented in the hardware block for 110 the Rx state machine.

The process block 72 for processing FLPM time-critical functions includes functions for performing decryption;

these functions are implemented in the hardware block 106 for encryption and decryption. This process block 72 also includes functions for determining whether a time-critical response is needed and whether the frame is intended for the network unit; these functions are implemented in the hardware block 110 for the Rx state machine. This process block 72 also includes functions for CRC check; these functions are implemented in the hardware block 112 for CRC. This process block 72 also includes functions for determining whether the frame was anticipated (e.g., an ACK (acknowledgment)); these functions are implemented in the hardware block 108 for the Tx state machine. This process block 72 also includes functions for filtering (e.g., routing the frame to the host CPU); these functions are implemented in the hardware block 110 for the Rx state machine.

The process block 74 for formulating FLPM time-critical responses includes functions for adding a sequence number, encrypting data, and formulating an ACK (acknowledgment), RTS (request to send), or an CTS (clear to send); these functions are implemented in the hardware block 110 for the Rx state machine when the functions are for receiving data and in the hardware block 108 for the Tx state machine when the functions are for transmitting data. Although functions to support the encryption of data are carried out in the hardware blocks 108, 110 for the Rx state machine and the Tx state machine, the actual encryption of frames is carried out in the hardware block 106 for encryption and decryption.

The process block 76 for accumulating statistics includes functions for determining errors, RSSI (Received Signal Strength Indication), and frame counts; these functions are implemented in the hardware block 100 for the bus interface.

The process block 78 for updating MAC state includes functions for the TSF (timing synchronization function); these functions are implemented in the hardware block 114 for timers. This process block 78 also includes functions for determining the NAV (Network Allocation Vector) and the backoff parameters; these functions are implemented in the hardware block 108 for the Tx state machine.

The process block 80 for formulating outgoing frames includes functions for performing encryption, adding a sequence number, and determining a PLCP (physical layer convergence protocol) header; these functions are implemented in the hardware block 108 for the Tx state machine. Although functions to support the encryption of data are carried out in the hardware block 108 for the Tx state machine, the actual encryption of frames is carried out in the hardware block 106 for encryption and decryption.

The process block 84 for generating special frames includes generating special frames based on time (e.g., beacons); these functions are implemented in the hardware block 108 for the Tx state machine with input from the hardware block 114 for timers. This process block 84 also includes generating special frames based on incoming messages (e.g., PS (Power Save) poll); these functions are implemented in the hardware block 108 for the Tx state machine with input from the hardware block 114 for timers.

Hardware blocks 100, 102, 104, 106, 108, 110, 112, 114 associated with the MAC 42 unit are preferably implemented on a single IC chip with other functional components. In a specifically preferred embodiment, the NIC 38 includes an IC chip having MAC functions together with DSP (Digital Signal Processing) functions. Other components on the NIC 38 implement the transmitter and receiver that are connected between the IC chip and the antenna 44 shown in FIG. 3.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A hardware system for performing media access control functions between a host central processing unit and a network, the system comprising:
    a buffer interface that sends frames to the host central processing unit and receives frames from the host central processing unit;
    a frame transmitter that includes a transmit buffer that receives frames from the buffer interface and sends frames to the network;
    a frame receiver that includes a receive buffer that receives frames from the network and sends frames to the buffer interface; and
    an encryption/decryption block that sends and receives frames between the transmit buffer and the receive buffer.

2. The hardware system according to claim 1, wherein the buffer interface, frame transmitter, frame receiver and encryption/decryption block are together comprised of a single integrated circuit.

3. The hardware system according to claim 1 wherein the frame transmitter includes a transmit state machine, the frame receiver includes a receive state machine, and further including:
    a cyclic redundancy code block that receives frames from the receive state machine and the transmit buffer and sends frames to the transmit state machine; and
    a timer block that controls timing for frames that are respectively sent from and received by the system.

4. The hardware system according to claim 1 wherein the frame receiver further includes a filtering block for filtering frames.

5. The hardware system according to claim 1 wherein the frame receiver further includes a retry operations block for determining when retransmission of a particular frame is needed.

6. The hardware system according to claim 1 wherein the frame transmitter includes an acknowledgement block for determining that a particular frame was anticipated and sending an acknowledgement message corresponding thereto.

7. The hardware system according to claim 1 wherein the frame transmitter further includes a special frames generation block.

8. The hardware system according to claim 7 wherein the special frames generation block includes means for generating beacons.

9. The hardware system according to claim 1 further including a timer block that controls timing for frames that are sent from and received by the system.

10. The hardware system according to claim 9 wherein the frame transmitter includes a transmit state machine, the frame receiver includes a receive state machine, and further including:
    a cyclic redundancy code block that receives frames from the receive state machine and the transmit buffer and sends frames to the transmit state machine.

11. The hardware system according to claim 9 wherein the frame receiver further includes a filtering block for filtering frames.

12. The hardware system according to claim 9 wherein the frame receiver further includes a retry operations block for determining whether retransmission of a particular frame is needed.

13. The hardware system according to claim 9 wherein the frame transmitter includes an acknowledgement block for determining that a particular frame was anticipated and sending an acknowledgement message corresponding thereto.

14. The hardware system according to claim 9 wherein the frame transmitter further includes a special frames generation block.

15. The hardware system according to claim 14 wherein the special frames generation block includes means for generating beacons.

16. The hardware system according to claim 1, wherein the buffer interface, frame transmitter, frame receiver and encryption/decryption block implement certain functions of a media access control (MAC) sublayer in accordance with IEEE 802.11.

17. A hardware system for performing media access control functions between a host central processing unit and a network, the system comprising:
   a buffer interface that sends frames to the host central processing unit and receives frames from the host central processing unit;
   a frame transmitter that includes a transmit buffer that receives frames from the buffer interface and sends frames to the network;
   a frame receiver that includes a receive buffer that receives frames from the network and sends frames to the buffer interface; and
   a timer block that controls timing for frames that are sent from and received by the system, the timer block thereby controlling interframe spacing and timing.

18. The hardware system according to claim 17 wherein the frame receiver further includes a filtering block for filtering frames.

19. The hardware system according to claim 17 wherein the frame receiver further includes a retry operations block for determining whether retransmission of a particular frame is needed.

20. The hardware system according to claim 17 wherein the frame transmitter includes an acknowledgement block for determining that a particular frame was anticipated and sending an acknowledgement message corresponding thereto.

21. The hardware system according to claim 17 wherein the frame transmitter further includes a special frames generation block.

22. The hardware system according to claim 21 wherein the special frames generation block includes means for generating beacons.

23. The hardware system according to claim 17 further including an encryption/decryption block that sends and receives frames between the transmit buffer and the receive buffer.

24. The hardware system according to claim 17 wherein the frame transmitter includes a transmit state machine, the frame receiver includes a receive state machine, and further including:
   a cyclic redundancy code block that receives frames from the receive state machine and the transmit buffer and sends frames to the transmit state machine.

25. The hardware system according to claim 17, wherein the buffer interface, frame transmitter, frame receiver and timer block implement certain functions of a media access Control (MAC) sublayer in accordance with IEEE 802.11.

26. The hardware system according to claim 17, wherein the buffer interface, frame transmitter, frame receiver and timer block are together comprised of a single integrated circuit.

27. A method for processing frames from a network to a host in a media access control layer, the method comprising:
   receiving an incoming frame from the network; and
   processing, using operations implemented by hardware in an integrated circuit, the incoming frame for time-critical functions, the time critical functions including:
   sending an outgoing frame corresponding to the incoming frame to the host;
   formulating time-critical responses;
   accumulating statistics; and
   updating a media access control state.

28. The method according to claim 27, wherein the integrated circuit is comprised of a single integrated circuit.

29. The method according to claim 27 wherein the time critical functions implemented by hardware operations include decrypting the incoming frame.

30. The method according to claim 27 wherein the time critical functions implemented by hardware operations include determining whether retransmission of a particular frame is needed.

31. The method according to claim 27 wherein the time critical functions implemented by hardware operations include determining whether a particular frame was anticipated and sending an acknowledgement message corresponding thereto.

32. The method according to claim 27, wherein the time-critical functions comprise certain functions of a media access control (MAC) sublayer in accordance with IEEE 802.11.

33. The method according to claim 27 wherein the time critical function of formulating time-critical responses includes formulating an outgoing response frame for transmission to the network.

34. The method according to claim 33 wherein the time critical function of formulating an outgoing response frame includes transmitting the outgoing response frame to the network.

35. The method according to claim 34 wherein the hardware operations for transmitting the outgoing response frame include generating a special frame.

36. The method according to claim 35 wherein the special frame includes a beacon.

37. The method according to claim 35 wherein the hardware operation of formulating an outgoing response frame includes receiving an incoming frame from the host central processing unit corresponding to the outgoing response frame.

* * * * *